United States Patent
Moriyasu et al.

(10) Patent No.: US 6,539,642 B1
(45) Date of Patent: Apr. 1, 2003

(54) PROBE TYPE SHAPE MEASURING SENSOR, AND NC PROCESSING EQUIPMENT AND SHAPE MEASURING METHOD USING THE SENSOR

(75) Inventors: Sei Moriyasu, Tokyo (JP); Yutaka Yamagata, Wako (JP); Hitoshi Ohmori, Wako (JP); Shinya Morita, Tokyo (JP)

(73) Assignee: Riken (JP)

( * ) Notice: Subject to any disclaimer, the term of this patent is extended or adjusted under 35 U.S.C. 154(b) by 0 days.

(21) Appl. No.: 09/763,747
(22) PCT Filed: Mar. 1, 2000
(86) PCT No.: PCT/JP00/01196
§ 371 (c)(1), (2), (4) Date: Feb. 27, 2001
(87) PCT Pub. No.: WO00/52419
PCT Pub. Date: Sep. 8, 2000

(30) Foreign Application Priority Data

Mar. 3, 1999 (JP) ............................................. 11-055835

(51) Int. Cl.⁷ .................................................. G01B 5/20
(52) U.S. Cl. ............................................ 33/551; 33/559
(58) Field of Search .......................... 33/556, 559, 560, 33/561, 551, 553

(56) References Cited

U.S. PATENT DOCUMENTS

| | | | | |
|---|---|---|---|---|
| 4,417,400 A | * | 11/1983 | Dall'Aglio | 33/556 |
| 5,018,278 A | * | 5/1991 | Aehnelt et al. | 33/559 |
| 5,174,039 A | * | 12/1992 | Murai | 33/556 |
| 5,473,822 A | * | 12/1995 | Struble | 33/559 |
| 5,548,902 A | * | 8/1996 | Ernst | 33/559 |
| 5,755,038 A | * | 5/1998 | McMurtry | 33/559 |
| 5,806,201 A | * | 9/1998 | Feichtinger | 33/556 |
| 5,918,378 A | * | 7/1999 | McMurtry et al. | 33/560 |
| 6,370,788 B1 | * | 4/2002 | Hellier et al. | 33/556 |

FOREIGN PATENT DOCUMENTS

| | | |
|---|---|---|
| EP | 0 356 513 A1 | 3/1990 |
| EP | 0 471 371 A2 | 2/1992 |
| JP | 3-71843 | 7/1991 |
| JP | 06-288747 A | 10/1994 |
| JP | 10-253308 A | 9/1998 |

* cited by examiner

*Primary Examiner*—G. Bradley Bennett
(74) *Attorney, Agent, or Firm*—Griffin & Szipl, P.C.

(57) ABSTRACT

A probe head 10 and a laser interferometric displacement meter 20 are provided. The probe head supports a probe 2 that is capable of contacting a workpiece 1, that is free to move in the direction of the workpiece, and drives the probe towards the workpiece. The displacement meter measures the displacement of the probe with a high accuracy without contact. The probe head 10 is also provided with a probe shaft 12 with steps 11a, 11b at intermediate portions thereof and air bearings 14a, 14b that support the probe shaft on each side of the steps. The air bearings have a high stiffness in the radial direction, and the probe shaft is made to float by using compressed air, thus the resistance of the shaft to sliding is reduced. In addition, another compressed air is supplied to the location of the step and produces a driving force in the direction of the workpiece due to the difference of cross sectional areas on each side of the step, that provides a very small load within a predetermined range. Thereby, the measuring pressure can be adjusted to a constant very small load without reducing the stiffness of the bearings of the probe, and the measuring pressures can be varied freely. Therefore, a sub-micron accuracy of about 0.1 μm can be obtained, and the equipment can be made compact and is easily applied to on-machine measurements.

20 Claims, 7 Drawing Sheets

Reflecting mirror
Optical fiber type laser interferometer

PROBE TYPE SHAPE MEASURING SENSOR, AND NC PROCESSING EQUIPMENT AND SHAPE MEASURING METHOD USING THE SENSOR

BACKGROUND OF THE INVENTION

1. Technical Field of the Invention

The present invention relates to a probe type shape measuring sensor, and a NC processing equipment and a shape measuring method using the sensor.

2. Prior Art

When a workpiece must be manufactured precisely it is essential to have a technology for measuring the shape of the workpiece on the processing machine, i.e. so-called on-machine measurement technology. Such an on-machine measurement technology can improve the accuracy of the processing by eliminating the positioning errors which occur when the workpiece is removed and replaced, and at the same time the processing efficiency can be improved and the measurements can be automated and the manpower required for preparations can be saved.

Apparatus for measuring the shape of a workpiece, known in the prior art, include a probe type shape measuring sensor wherein the tip of a measurement probe touches the surface of the workpiece and measures the shape thereof. Such probe type shape measuring sensors are classified generally into analog and digital types depending on the means of detecting the position of the measurement probe.

In an analog-type shape measuring sensor, for example in an electric micrometer, displacements in the position of the probe are converted into analog electric values by detecting variations in the voltage of a differential transformer, electrostatic capacitance, resistance of a strain gauge, etc. However, because the system uses analog signals, large drifts in the output occur and the detected output is not very linear, so sub-micron accuracy such as about 0.1 $\mu$m cannot possibly be obtained if the overall distance moved by the sensor is about 100 $\mu$m.

Conversely, a digital-type shape measuring sensor, such as for example a digital micrometer, measures displacements in the position of the measurement probe, digitally using an optical scale, magnetic scale or a length measuring system using optical interferometer, therefore a maximum resolution of about 10 nm can be achieved.

However, even with the digital-type shape measuring sensor, the measurement probe must be supported by a linear ball bearing or an air slide, to enable it to move in the axial direction, and a spring or air pressure is used to press the probe onto the workpiece. Consequently, the measurement pressure fluctuates as the probe moves, and a large pressure is needed for the measurement and the pressure cannot be controlled freely, and this is a practical problem.

More explicitly, a spring applies a minimum pressure of about 10 grams which is too large to obtain a high accuracy, and because the spring force varies depending on the displacement of the probe resulting in variations in the pressure, there are large measurement errors, which is also another problem. When air pressure is applied, although the measurement pressure can be reduced by using a low air pressure, the minimum is still about 1 gram. There is another problem that if the air pressure is reduced, the stiffness of the air slide is also reduced, allowing the probe to tilt excessively, and the measurement errors are increased. Therefore, even with a digital system, a sub-micron accuracy of about 0.1 $\mu$m cannot be achieved.

To obtain a high accuracy of the sub-micron order, it is desirable that the measurement pressure should be as low as possible (preferably, about 500 milligrams or less). And to prevent a deterioration in the measurement accuracy caused by sideways displacements of the probe during a measurement, the measurement pressure should preferably be freely adjustable. These requirements have been shown by analysis.

To satisfy these requirements, a high-accuracy shape measuring device typically as shown in FIG. 1 has been developed. This shape measuring device uses a minimum measuring force as small as about 50 milligrams, and measures the displacement of the measurement probe with a laser interferometer, thereby achieving a measurement accuracy of about 0.1 $\mu$m. However, with the device shown in FIG. 1, many optical elements such as moving mirrors and prisms are required, so the device itself becomes very large and delicate, therefore the device has the problem that it cannot be installed on a processing machine for making measurements on the machine.

When the aforementioned probe type shape measuring sensor is installed on a conventional NC processing device, a personal computer etc. is used to output a command to define the position of each point to be measured, to the NC control device. And the probe is stopped for a predetermined time at the defined point, and when the position of the probe is considered to have stabilized, the output from the shape measuring sensor is saved to determine the shape of a workpiece. However, according to this means, the times required to move the probe to the defined positions and the waiting times during which the probe is stopped accumulate, a long time is required. In addtion as intermediate points between points cannot be measured, a large number of defined points are required, so causing the problem that very long time is required to complete the measurements.

SUMMARY OF THE INVENTION

The present invention is aimed at solving the various problems mentioned above. That is, an object of the present invention is to provide a probe type shape measuring sensor with a small electric drift, excellent linearity of the output, small variations in measurement pressures during changes in the position of the probe, without decreasing the stiffness of the probe bearing, measurement pressures that can be adjusted to a constant very small load and changed freely, thus a sub-micron accuracy of about 0.1 $\mu$m can be obtained, and also capable of being made compact, and easily applied to on-machine measurements, and an NC processing apparatus and a shape measuring method using the sensor.

Another object of the present invention is to offer an NC processing apparatus and a shape measuring method using the aforementioned probe type shape measuring sensor, in which the waiting time is reduced, and the shape between defined points can be measured, thereby enabling the number of necessary defined points to be reduced and the measuring time shortened.

According to the present invention, a probe type shape measuring sensor is provided and characterized to be composed of a probe head (10) that supports a probe (2) that contacts a workpiece (1) in such a way that the probe can move towards the workpiece with an extremely low resistance to sliding and drives the probe towards the workpiece with a very low force, and a displacement measuring device (20) that measures the displacement of the probe, very accuracy and without contact.

Because the probe (2) is supported by the probe head (10) so that it can move with an extremely low resistance to sliding and is driven towards the workpiece, the probe can trace the surface of the workpiece precisely while contacting the surface of the workpiece with a very low load (about 500 mgf or less). Furthermore, by measuring the displacement of the probe with the displacement measuring device (20) which is very accurate and requires no contact, a sub-micron accuracy of about 0.1 μm can be achieved.

According to a preferred embodiment of the present invention, the aforementioned probe head (10) is provided with a long thin probe shaft (12) with the probe installed at one end (12a) thereof and a step in cross section (11a, 11b) at an intermediate portion thereof, air bearing (14a, 14b) that are disposed at each side of the above-mentioned step and support the probe shaft, and a means (16) of feeding air that supplies gas at the first pressure to the location of the aforementioned step; the above-mentioned air bearings have a high stiffness in the radial direction and are disposed in such a way that the gas at the first pressure causes the probe shaft to float to reduce its resistance to sliding; the aforementioned gas feeding means keeps the pressure or pressures of gas or gasses at second and/or third pressures supplied to the location of the aforementioned step at a constant value or constant values, thereby the gas feeding means produces a driving force due to the step in the direction of the workpiece being measured and keeps the load very small within a predetermined range.

The long thin probe shaft (12) with the probe attached at one end (12a) thereof is supported by the air bearings (14a, 14b), and the first pressurizing gas for instance, compressed air increases the stiffness of these air bearings in the radial direction, and causes the probe shaft to float. Thus the probe shaft can be supported with an extremely low resistance to sliding and can move towards the workpiece while the probe shaft is prevented from being tilted by the friction between the probe and the workpiece, therefore, measurement errors can be prevented from increasing. In addition, the steps (11a, 11b) are constructed at intermediate portions of the probe shaft, and the means (16a, 16b) of feeding gas supplies the location of the steps with second and/or third pressurizing gas or gasses (for instance, another sources of compressed air). Thereby the driving force produced by the difference in sectional areas of the shaft in the direction of the workpiece can be maintained at a constant very low load within a predetermined range.

Therefore, because the driving force is created by the difference in sectional areas due to the step in the shaft in the direction of the workpiece, a drift of the output is completely eliminated. Also, because second and/or third pressurizing gas or gasses are supplied to produce the driving force in the direction of the workpiece, independently from the first pressurizing gas that keeps the probe shaft floating, the measuring pressure can be adjusted to a constant very small load without degrading the stiffness of the bearings of the probe. Furthermore, as the driving force in the direction of the workpiece is proportional to the pressure difference in shaft cross sectional areas and no springs etc. are used, variations in the measuring force caused by changes in the position of the probe can be eliminated, so that the linearity of the output is improved, and the measuring force can be freely changed by controlling the pressures of second and/or third pressurizing gas or gasses.

The aforementioned driving force given to the probe shaft in the direction of the work piece should preferably be about 10 mgf or more and no more than about 500 mgf. If the driving force in the direction of the workpiece exceeds about 500 mgf, friction between the probe and the workpiece increases, resulting in a large tilt of the probe shaft, so a sub-micron accuracy of about 0.1 μm cannot be obtained. Also if it is less than about 10 mgf, the probe may often bounce, so that the measuring speed is greatly reduced.

The above-mentioned displacement measuring device (20) is provided with a reflecting mirror (21) installed at the other end (12b) of the probe shaft, an optical fiber (22) with its emitting end surface (22a) located opposite and apart from the aforementioned reflecting mirror, and a laser interferometric displacement meter (24) that transmits laser light through the above-mentioned optical fiber to the aforementioned reflecting mirror and measures the position of the reflecting mirror by light reflected between the reflecting mirror and the emitting end surface.

In this configuration, using the laser interferometric displacement meter (24), the position of the reflecting mirror (21) can be measured with a high accuracy of 0.1 μm. In addition, because the laser light is transmitted to the reflecting mirror through the optical fiber (22), the moving parts of the probe head (10) and the laser interferometric displacement meter (24) can be made compact. Moreover, because the probe shaft (12) can be made with a light weight, the response time for measurements is reduced, so high-speed measurements can be achieved.

Also because the main unit of the laser interferometric displacement meter can be located away from the probe head, the measuring instrument can be protected from thermal distortions so that highly accurate measurements can be achieved.

According to another aspect of the present invention, the invention is provided with NC processing equipment, that incorporates the aforementioned probe type shape measuring sensor, and moves the sensor by a numerical control system relative to the workpiece, thereby measuring the shape of the workpiece without needing to remove the workpiece which is to be processed henceforth.

This configuration enables a sub-micron accuracy of about 0.1 μm to be achieved, and because the probe type shape measuring sensor that can be made compact and is installed on the NC processing equipment, on-machine measurements become possible, positioning errors that may otherwise occur when the workpiece is removed and remounted can be eliminated so improving the accuracy of the processing, and the time and manpower required for preparations can be saved and the processing efficiency can be improved by automation.

According to still another embodiment of the present invention, the aforementioned NC processing equipment is provided with an interface that outputs the coordinates of each numerical control axis and the signals from the probe type shape measuring sensor, in real time for use outside the equipment.

Using this configuration, the coordinates of each numerical control axis and the output signals from the probe type shape measuring sensor can be saved in a computer etc. outside the equipment, through the interface, in real time while the probe type shape measuring sensor is being driven and moved to obtain a profile of the workpiece, without needing to stop the NC control equipment at a defined point for positioning. Therefore, the number of defined points can be reduced and the time required for the measurements is decreased.

Further according to the present invention, the probe (2) in contact with the workpiece (1) is installed at one end (12a) of the long thin probe shaft (12) which has steps (11a, 11b), and while the aforementioned probe shaft is supported by the first pressurizing gas so as to be able to move with an extremely low friction, the shaft is maintained with a high stiffness in the radial direction, second and/or third pressurizing gas or gasses are supplied to the location of the above-mentioned steps, the driving force of the probe shaft in the direction of the workpiece is kept very small by the pressure or pressures thereof, and the displacement of the probe in the direction of the workpiece is measured with the laser interferometric displacement meter (24).

According to this method, the probe (2) is supported so it can move with an extremely low resistance to sliding, and is driven in the direction of the workpiece. Thereby the probe can precisely follow the profile of the surface of the workpiece while the probe is kept in contact with the surface of the workpiece with a very small load. In addition, by measuring the displacement of the probe with the laser interferometric displacement meter (24) with a high accuracy in a manner which requires no contact, a sub-micron accuracy of about 0.1 $\mu$m can be achieved. Independently from the first pressurizing gas that makes the probe shaft float, second and/or third pressurizing gas or gasses are supplied that produce the driving forces in the direction of the workpiece. Therefore, the measuring pressure can be adjusted to maintain a constant, very small load without reducing the stiffness of the bearings of the probe. In addition, because the driving force in the direction of the workpiece is proportional to the pressure applied to the portion where there is a step, variations in the measuring pressure that might otherwise result from changes in the position of the probe can be eliminated, so that the linearity of the output is improved, and furthermore, the measuring pressure can be changed freely by controlling the pressure or pressures of the second and/or third pressurizing gas or gasses.

Moreover, the present invention also provides a shape measuring method wherein the above-mentioned probe type shape measuring sensor is built into an NC processing device, and the sensor is moved relative to the workpiece by a numerical control system, and thus the shape of the workpiece after processing can be measured without removing it from the equipment.

This method makes on-machine measurement possible, eliminates positioning errors due to removing and remounting the workpiece, thereby increasing the accuracy of processing, and furthermore, the manpower required for preparation at that time can be saved, thereby improving the efficiency of processing and, at the same time the operation can be automated.

In the aforementioned shape measuring method, it is preferred that the above-mentioned NC processing equipment is not stopped but is used to measure the shape of the workpiece by directly outputting in real time the coordinates the numerical control axes of the aforementioned NC processing equipment together with the output signals from the above-mentioned probe type shape measuring sensor to external equipment.

Using this method, the coordinates of the numerical control axes of the NC processing device and the output signals from the probe type shape measuring sensor can be stored in a computer etc. outside the equipment, in real time as the probe type shape measuring sensor is being used to obtain a profile of the workpiece. Therefore, the shape of the workpiece can be measured, and the measuring time can be reduced without needing to stop the NC processing device.

Other objects and advantages of the present invention are revealed in the following paragraphs referring to the attached drawings.

DESCRIPTION OF PREFERRED EMBODIMENTS

Preferred embodiments of the present invention are described below. In each drawing, the same portions are identified with the same reference numbers, and no duplicate descriptions are given.

Figure 1:
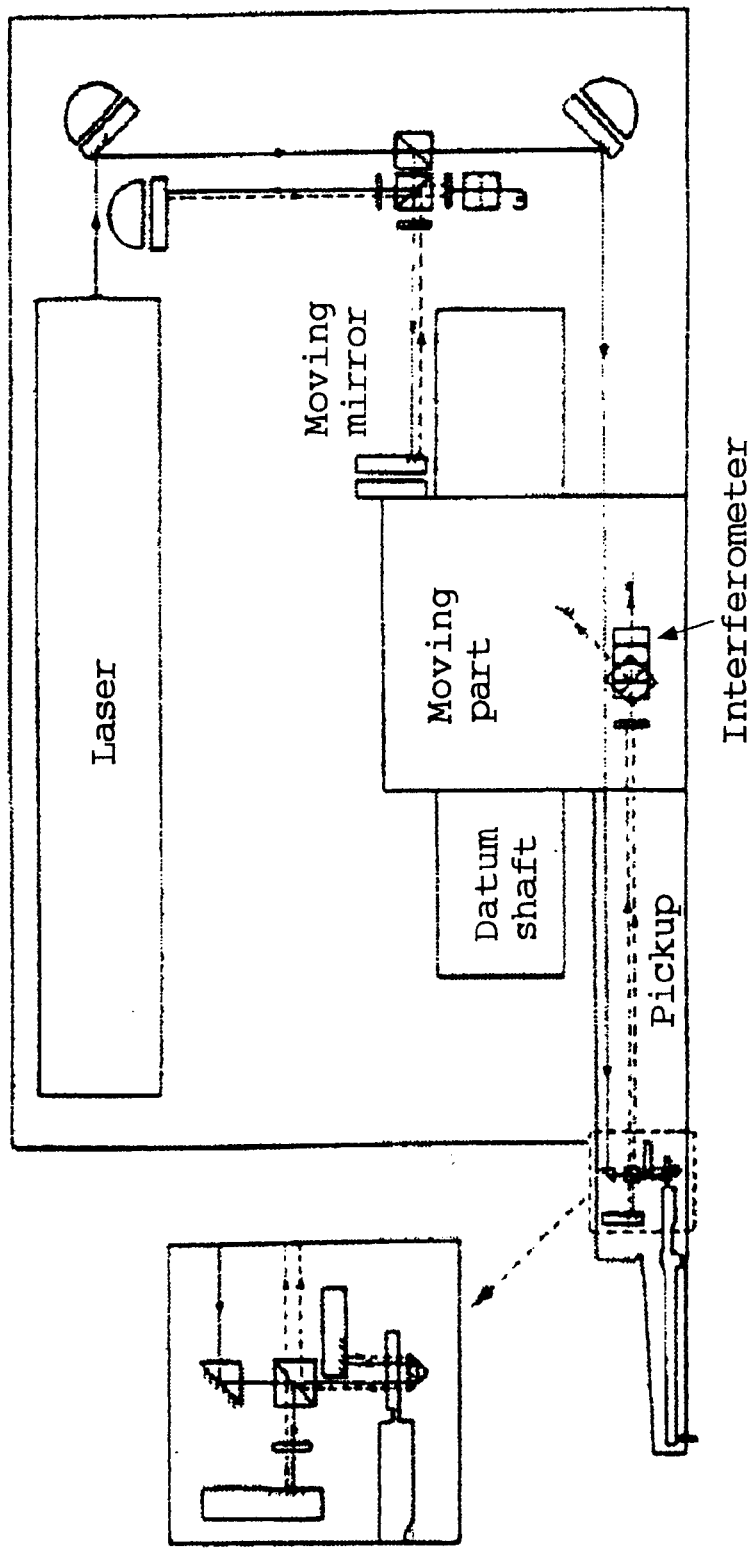
FIG. 1 shows the configuration of a conventional high-accuracy shape measuring device.
Figure 2:
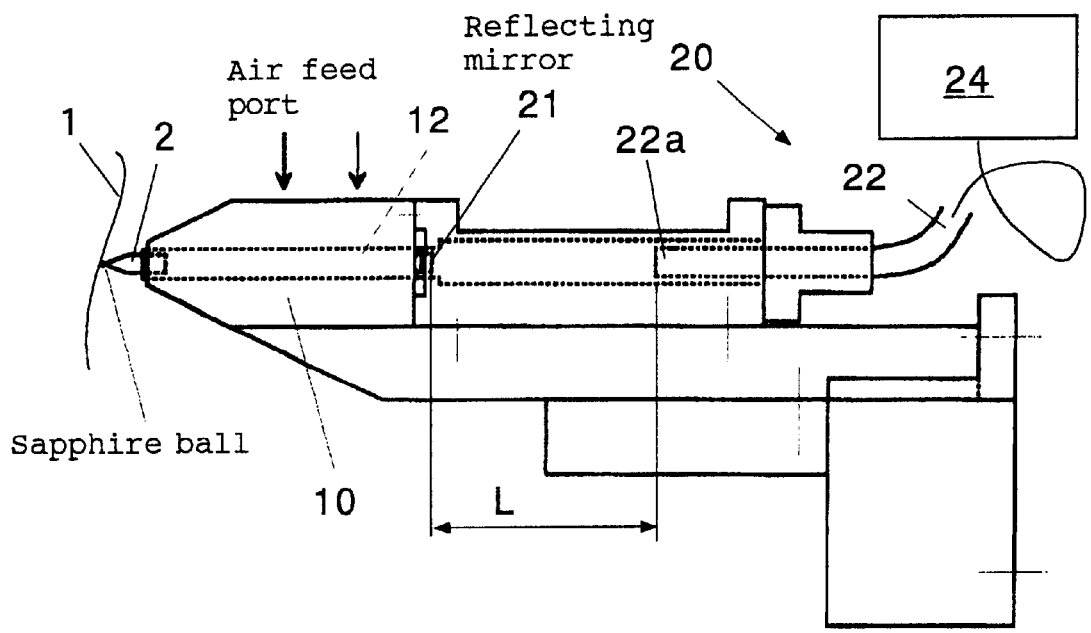
FIG. 2 shows a general configuration of a probe type shape measuring sensor according to the present invention.

FIG. 2 shows the general configuration of the probe type shape measuring sensor according to the present invention. As shown in this figure, the probe type shape measuring sensor according to the present invention is composed of a probe head 10 and a displacement measuring device 20. The probe head 10 supports a probe 2 that can contact a workpiece 1, with an extremely low resistance to sliding, in a manner such that it can move horizontally, and also drives the probe in the direction of the workpiece 1, horizontally with a small load. The displacement measuring device 20 measures the horizontal displacement of the probe 1 in a highly accurate manner without contact. At the tip of the probe 2 (contact portion), in this example, a spherical sapphire ball is installed for the purpose of reducing the friction with the workpiece 1 and preventing wear.

Figure 3:
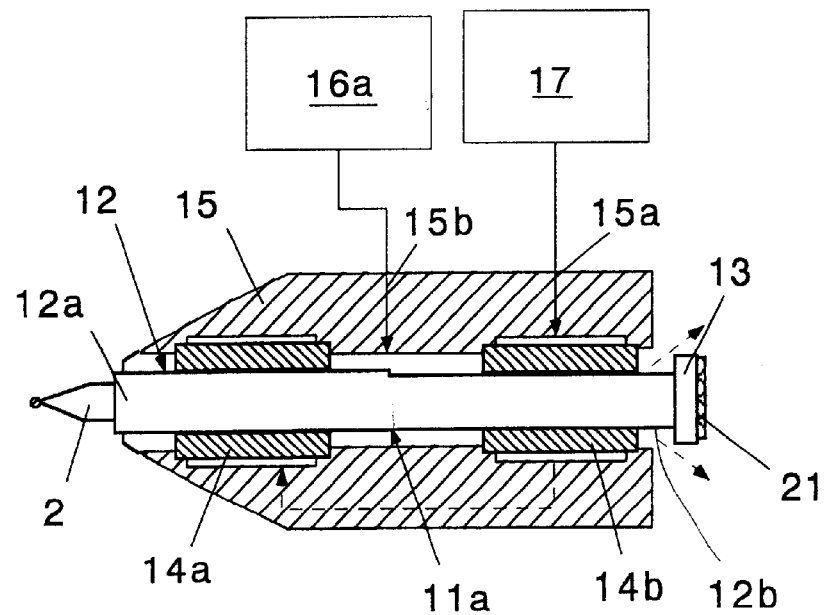
FIG. 3 is a sectional view of part of FIG. 2.

FIG. 3 is a sectional view of part of the probe head 10 in FIG. 2. As shown in this figure, the probe head 10 is composed of a long thin probe shaft 12, air bearings 14a, 14b and gas feeding means 16, 17.

At one end 12a (left end in this figure) of the long thin probe shaft 12, a probe 2 is mounted, and the shaft has a step in cross section 11a at an intermediate portion. The probe shaft 12 is composed of a large portion at the end where the probe 2 is installed, and a smaller portion at the opposite end, between which there is a step 11a in cross section. The size of the cross sectional difference 11a is set so that the horizontal driving force, created by the difference between the different cross sectional areas is a very small load (for instance, about 500 mgf or less) in a predetermined range. In this example, the probe shaft has a rectangular cross section, however, the present invention is not limited only to this shape, but it can be circular.

Air bearings 14a, 14b are provided on each side of step 11a in cross section. These air bearings 14a, 14b have a high stiffness in the radial direction. In addition, these air bearings 14a, 14b make the probe shaft 12 float and reduce the resistance to sliding thereof using the first pressurizing gas (for example, compressed air) supplied through means 17 of feeding air (for example, a first passage way 15a in the main probe unit 15 connected to an air source, regulator, or electro-pneumatic regulator). After making the probe shaft 12 float, the first pressurizing gas is exhausted in both directions through the gaps between the air bearings 14a, 14b and the probe shaft 12.

The gas feeding means 16 is composed, for instance, of a second passage way 15b provided in the main probe unit 15 connected to an air source, regulator, or electro-pneumatic regulator, and supplies a second pressurizing gas (for example, another source of compressed air) to the location of the change 11a in cross section of the probe shaft 12. Because this gas feeding means 16 keeps the pressure of the second pressurizing gas to be supplied to the location of the change in cross section 11a, at a constant value, the horizontal driving force produced by the difference in cross sectional areas of the step 11a can be maintained at a very small constant load within a predetermined range.

In FIG. 3, a horizontal returning force is created by the difference in the sizes of the gaps of air bearings 14a, 14b. Therefore, in this example, an enlarged portion 13 of which the size is larger than the cross section of the probe shaft, is provided at the end 12b (right end in this figure) of the probe shaft 12. However, this portion can be eliminated. In addition, by setting this returning force appropriately, the sensor according to the present invention can be installed and used, in a vertical or inclined direction as well as horizontally.

Figure 4:
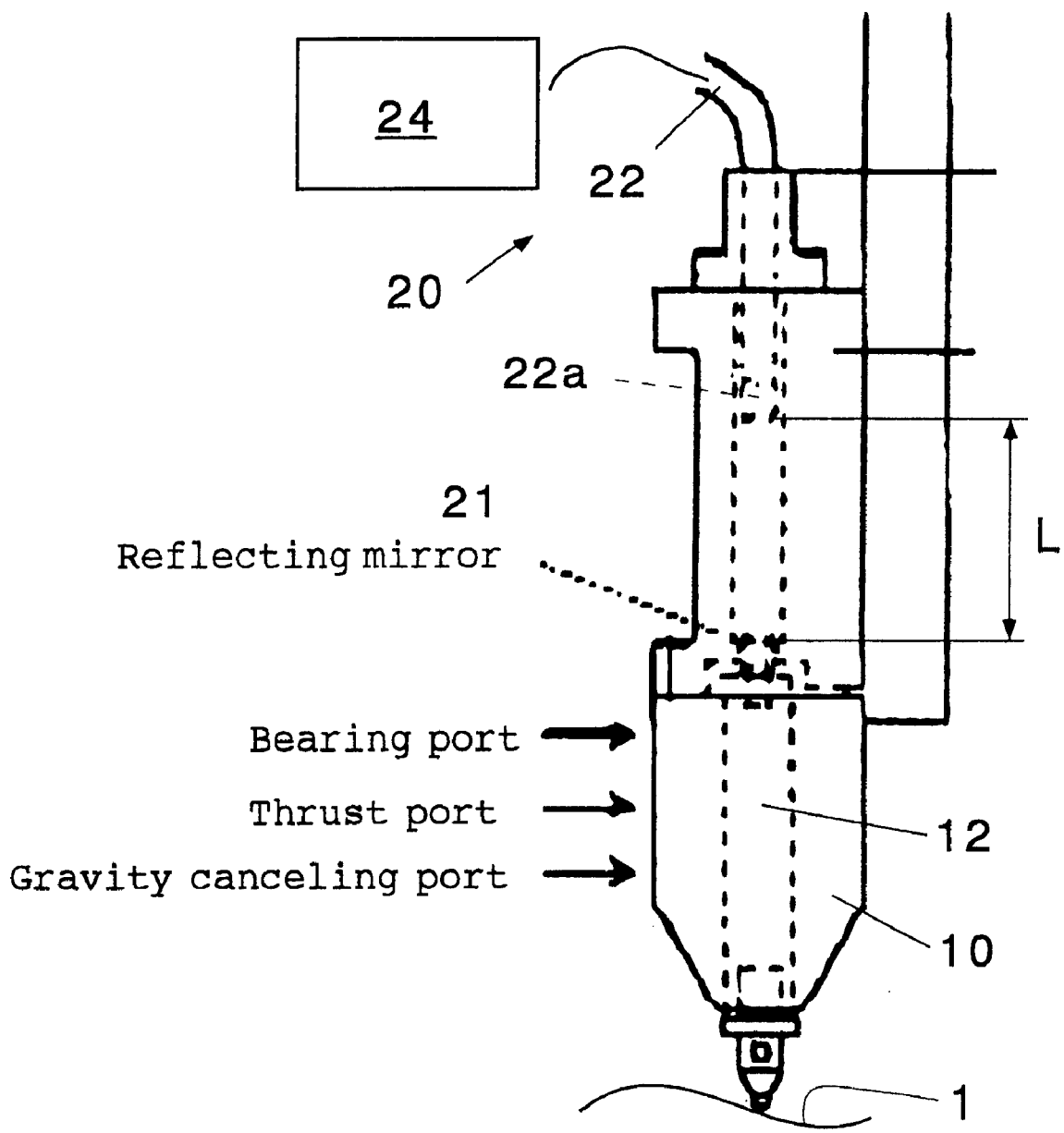
FIG. 4 shows a general configuration of another probe type shape measuring sensor according to the present invention.
Figure 5:
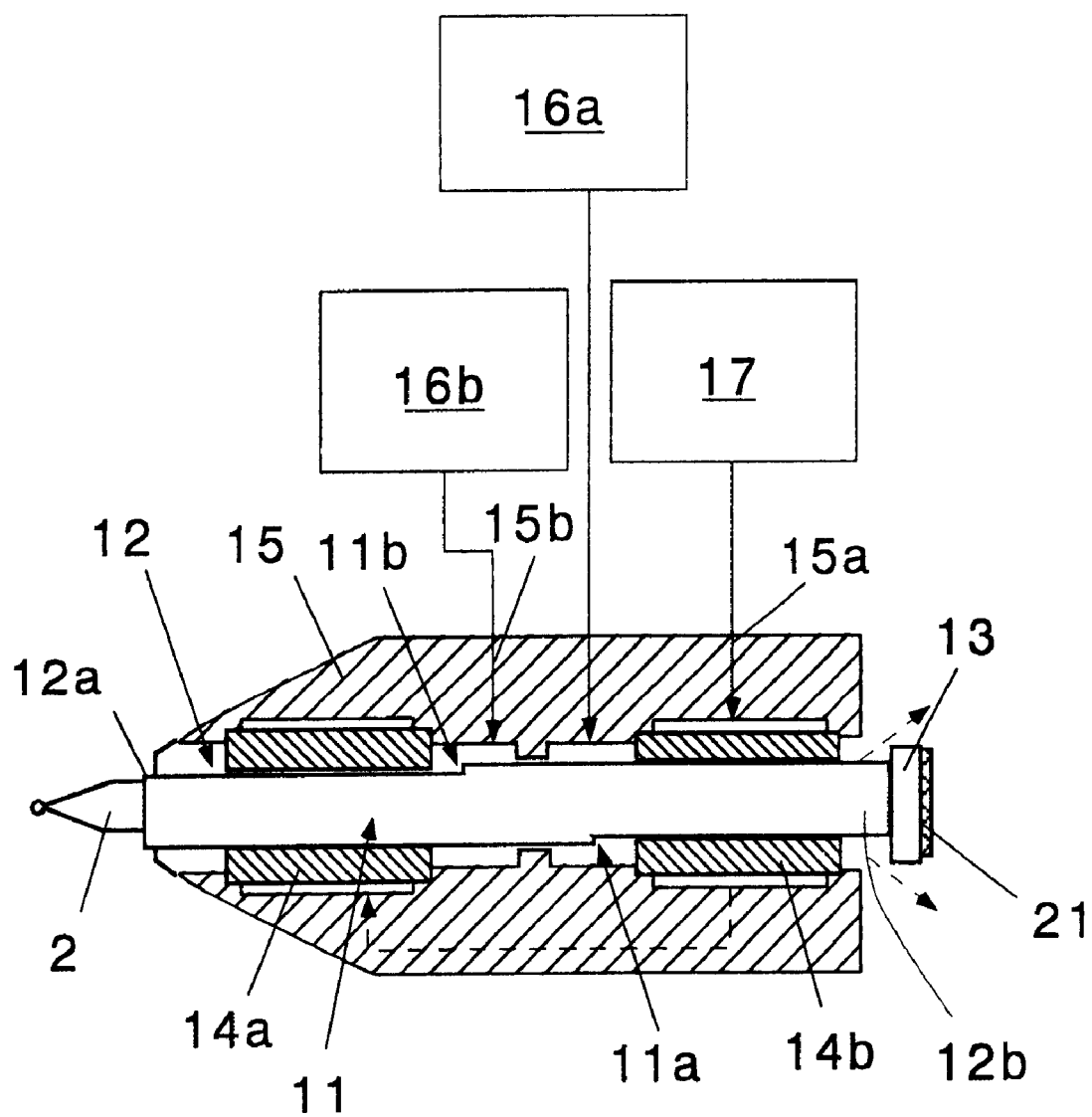
FIG. 5 is a sectional view of part of FIG. 4.

FIG. 4 shows the general configuration of another probe type shape measuring sensor according to the present invention. FIG. 5 is a sectional view of part of FIG. 4.

When the sensor of the present invention shown in FIG. 3, is installed and operated in a direction other than horizontal, such as in a vertical direction, the weight of the probe shaft 12 is added to the measuring force, so the measurement cannot be carried out with a very small load. Consequently, as shown in FIG. 4, a third pressurizing gas is supplied from the gas feeding means 16b, independently from first and second pressurizing gasses, and the pressure of the third pressurizing gas produces a returning force in the opposite direction to the direction of the driving force of the second pressuring gas, thereby the effect of the weight of the probe shaft 12 is canceled out.

In FIG. 5, the returning force is composed of a driving force produced by the difference in the gaps between the probe shaft 12 and air bearings 14a, 14b, and another driving force created by a difference in the areas of the step 11b by the pressure of the third pressurizing gas which is supplied to the location of the step 11b of the probe shaft, from the gas feeding means 16b. By setting this returning force appropriately, it is possible to install the sensor of the present invention in a vertical or inclined direction as well as horizontally, and make measurements with a very small load.

As shown in FIGS. 2, 3, 4 and 5, the displacement measuring device 20 is composed of a reflecting mirror 21, optical fiber 22 and laser interferometric displacement meter 24.

The reflecting mirror 21 is a flat mirror installed at the end 12b of the probe shaft 12, perpendicular to the center line. The optical fiber 22 is provided with an emitting end surface 22a opposite the reflecting mirror 21 with a distance L between them. The optical fiber 22 is flexible, sufficiently long, and the surface at the other end of the fiber is connected to the laser interferometric displacement meter 24 via, for instance, an optical connector etc.

The laser interferometric displacement meter 24 is composed of, for example, a semiconductor laser, a photo-detecting element, an optical fiber coupler, etc., and transmits laser light via the optical fiber 22 to the reflecting mirror 21, and measures the position of the reflecting mirror using the light reflected from the reflecting mirror 21 to the end surface 22a of the optical fiber.

Using this configuration, the laser interferometric displacement meter 24 can be used to measure the position of the reflecting mirror 21 with an accuracy as high as 0.1 $\mu$m. Since the laser light is transmitted through the optical fiber 22 to the reflecting mirror, the movable portions of the probe head 10 and the laser interferometric displacement meter 24 can be made compact.

In the aforementioned configuration, the probe 2 is supported by the probe head 10 with an extremely low resistance to sliding, in a manner such that it can move, and the probe can be driven towards the workpiece 1. Therefore the probe 2 can precisely follow the profile of the surface of the workpiece 1 while making contact with the surface with a very small load (about 500 mgf). In addition, because the displacement of the probe 2 in the direction of the workpiece is measured using the displacement measuring device 20 in a highly accurate manner without contact, a sub-micron accuracy of about 0.1 $\mu$m can be obtained.

In addition, the long thin probe shaft 12 with the probe 2 installed at one end 12a is supported by air bearings 14a, 14b and these air bearings 14a, 14b have a high stiffness in the radial direction, and the probe shaft 12 is made to float by the first pressurizing gas (compressed air). Therefore the probe shaft 12 can be supported with an extremely low resistance to sliding in the direction of the workpiece while the stiff bearings prevent the shaft as it slides from being tilted by the friction of the probe 2 as it slides, so that measurement errors can be prevented from increasing. In addition, the steps 11a, 11b are located at intermediate portions of the probe shaft, and the gas feeding means 16a, 16b supply the locations of the steps 11a, 11b with second and/or third pressurizing gas or gasses (other sources of compressed air), thus the driving force in the direction of the workpiece, produced by the difference in the areas at the steps 11a, 11b can be kept constant to produce a very small load within a predetermined range.

EMBODIMENTS

The following paragraphs describe the embodiments and analysis results of the aforementioned probe type shape measuring sensor, and the NC processing equipment and the shape measuring method using the sensor.

1. Analysis of Slipping and Tilting Errors of the Measurement Probe When Measuring a Slope The above-mentioned FIG. 2 shows a general view of the newly developed shape measuring sensor. A sapphire ball is installed at the tip of the measuring probe, and the probe shaft 12 is supported by air slides (air bearings 14a, 14b). The reflecting mirror 21 is mounted on the opposite end of the probe shaft, and the optical fiber laser interferometric displacement meter (displacement measuring device 20) measures the displacement of the probe, thereby the shape of a workpiece can be measured in principle. The measuring pressure can be varied within a range of about 0 mgf to 500 mgf by controlling the air pressure using an electro-pneumatic regulator.

Figure 6:
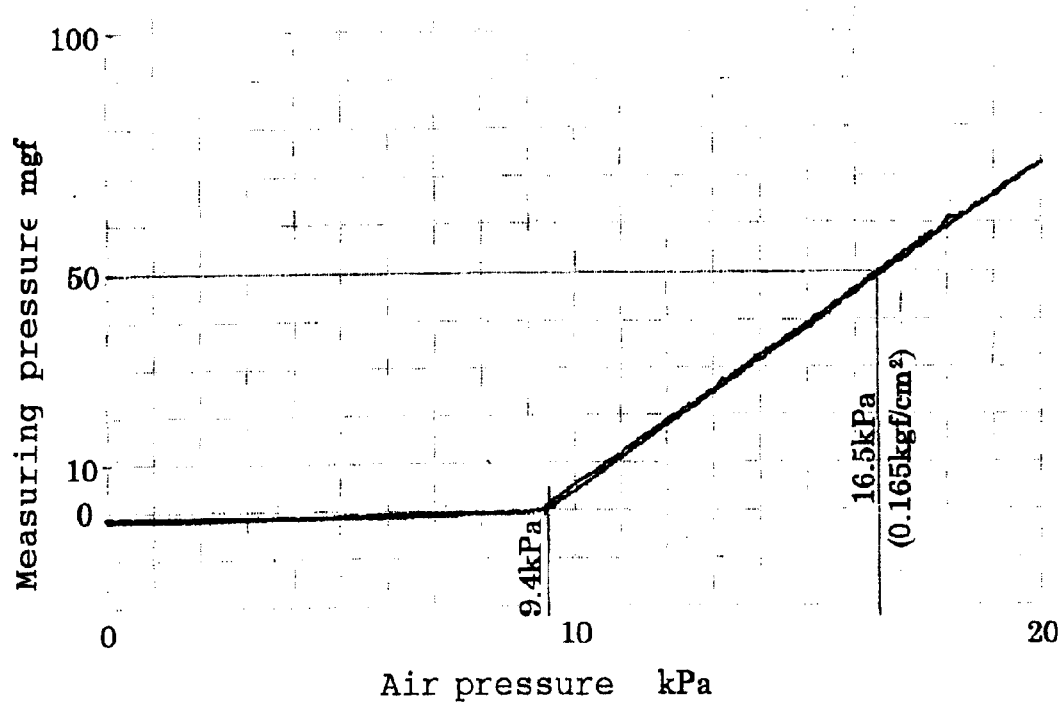
FIG. 6 illustrates the characteristics of the probe head shown in FIG. 2.

FIG. 6 shows the characteristics of the newly developed probe head. The measured air pressures of the second pressurizing gas (driving air) supplied to the location of the step 11a is shown on the abscissa, and the measured driving force is the ordinate. In FIG. 6, the horizontal driving force is slightly negative when the air pressure is less than about 9.4 kPa. It can also be seen that when the air pressure of the driving air exceeds about 9.4 kPa, the horizontal driving force increases precisely in proportion to the air pressure. It can therefore be understood that since the horizontal driving force is precisely proportional to the pressure at the location of the step and no spring etc. is used, variations in the measuring pressure when the position of the probe changes can be eliminated, the linearity of the detector output is improved, and the measuring pressure can be changed freely depending on the pressure of the second pressurizing gas.

Figure 7A:
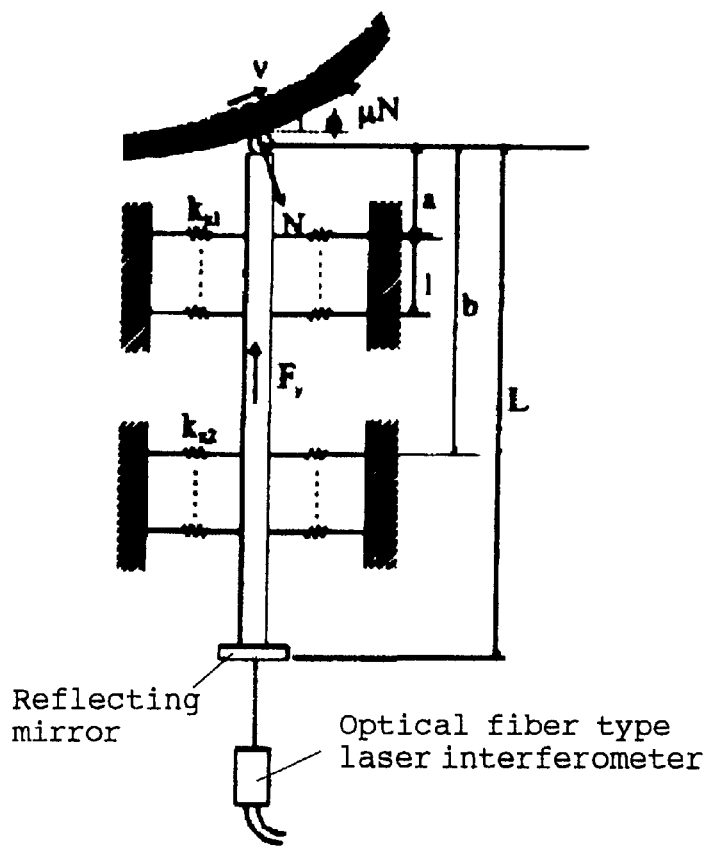
FIGS. 7A and 7B shows sketches of the behavior of the measuring probe during a measurement.
Figure 7B:
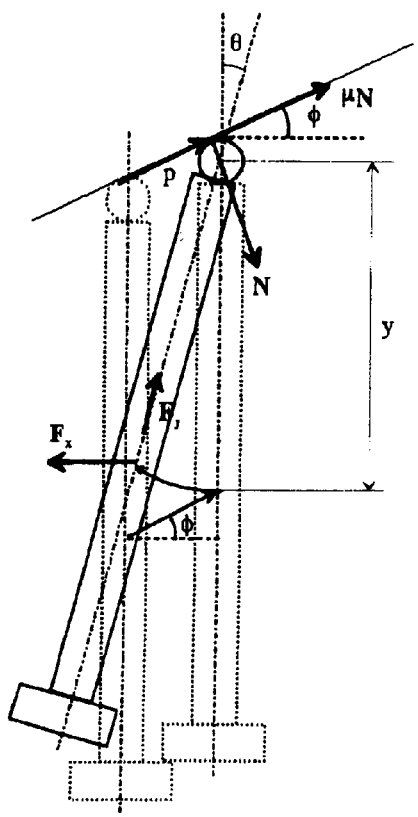

When the probe type shape measuring sensor is used for measuring a shape, slipping and tilting of the probe during the measurement will cause measurement errors, therefore, the sensor must be structurally designed so as to make such an error less than the specified measurement error. FIGS. 7A and 7B are typical illustrations to show the condition of the measuring probe during a measurement. Define r as the radius of curvature at the tip of the probe shaft, and assume that a slope with an angle φ is moving at a constant speed v during a measurement. Also assume that during the measurement, an external force $F_x$ from an air slide is acting in the radial direction, another external force $F_y$ is acting in the axial direction, and the reaction forces from the workpiece consist of a vertical reaction force N and a frictional force μN, and also assume that the probe shaft slips a distance p along the slope of the workpiece and tilts at an angle θ about the center of the ball at the tip of the probe. Then, the slipping and tilting error δ of the probe shaft during the measurement is given by the following formula by solving the equilibrium equations of the probe shaft in the radial and axial directions and the equilibrium equation of the moment of the probe shaft about the same center as above.

$$\delta = p\sin\phi + L(1-\cos\theta) = \qquad \text{[Equation 1]}$$

$$\frac{\alpha^2 + 1 + (\alpha+1)\zeta + \frac{2}{3}\zeta^2}{(\alpha-1)^2 + \frac{1}{3}\zeta^2}\tan\phi\xi\Phi\alpha +$$

$$\frac{\alpha\beta}{2}\left[\frac{\alpha+\zeta+1}{(\alpha-1)^2 + \frac{1}{3}\zeta^2}\xi\Phi\right]^2 \alpha \text{ where } \alpha = \frac{b}{a},$$

$$\beta = \frac{L}{a}, \quad \zeta = \frac{l}{a}, \quad \xi = \frac{F_y}{k_x \cdot a}, \quad \Phi = \frac{\sin\phi + \mu\cos\phi}{\cos\phi - \mu\sin\phi}$$

The first term of the above equation gives the error caused by the probe shaft slipping, and the second term is the error due to tilting. It can be understood that when the angle of inclination φ of the slope of the workpiece being measured is rather large, the measurement error due to an error in the geometrical position of the measuring probe is determined mainly by the error due to slipping, because the ratio of the axial resistance to the radial stiffness of the air slide, ξ, is a first order term.

Therefore, to achieve a measuring error δ<0.1 μm for the condition that the maximum angle of inclination φmax=60°, the dynamic friction coefficient μ=0.3 and the stiffness of the air bearing k=0.15 N/μm, measuring error δ<0.1 μm is given by the following equation.

$$F_y = k_x \cdot e_{xy} = \qquad \text{[Equation 2]}$$

$$k_x \xi \cdot \alpha < \frac{(\alpha-1)^2 + \frac{1}{3}\zeta^2}{\alpha^2 + 1 + (\alpha+1)\zeta + \frac{2}{3}\zeta^2} \cdot \frac{k_x \cdot \delta}{\tan\phi \cdot \Phi} \approx 0.065 \text{ gf}$$

Where the parameters used are the sensor structural constant α=28.2 mm/8.5 mm=3.32, β=49, 5 mm/8.5 mm=5.82 and ξ=14.3 mm/8.5 mm=1.68. Based on these values, an air slide of the shape measuring sensor was manufactured, and the stiffnesses of the slide were measured in X, Y, positive and negative directions, and the measured values were from 0.1 N/μm to 0.21 N/μm. That is, the target stiffness was substantially achieved.

2. Analysis of the Maximum Scanning Speed

When a shape is measured by a probe, particularly for a large workpiece, there is a need to increase the measuring speed. In this regard, when a sine surve shaped surface with a maximum amplitude of A is measured by a probe with a mass m with a measuring pressure $F_y$ and a measuring data pitch d, the maximum scanning speed $V_{max}$ for the probe to be able to closely follow the profile of the surface of the workpiece during a measurement is given by the following equation.

$$v_{max} = \frac{d}{2\pi} \cdot \sqrt{\frac{F_y}{mA}} \approx 53 \text{ mm/min} \qquad \text{[Equation 3]}$$

Where the parameters are d=0.01 μm, A=1 μm, m=2.1 g and $F_y$=0.065 g. From the above equation, it can be understood that to increase the maximum speed while maintaining a high measuring accuracy, the mass of the probe, m, must be made small.

3. Design of the Data Input/Output Interface

Figure 8:
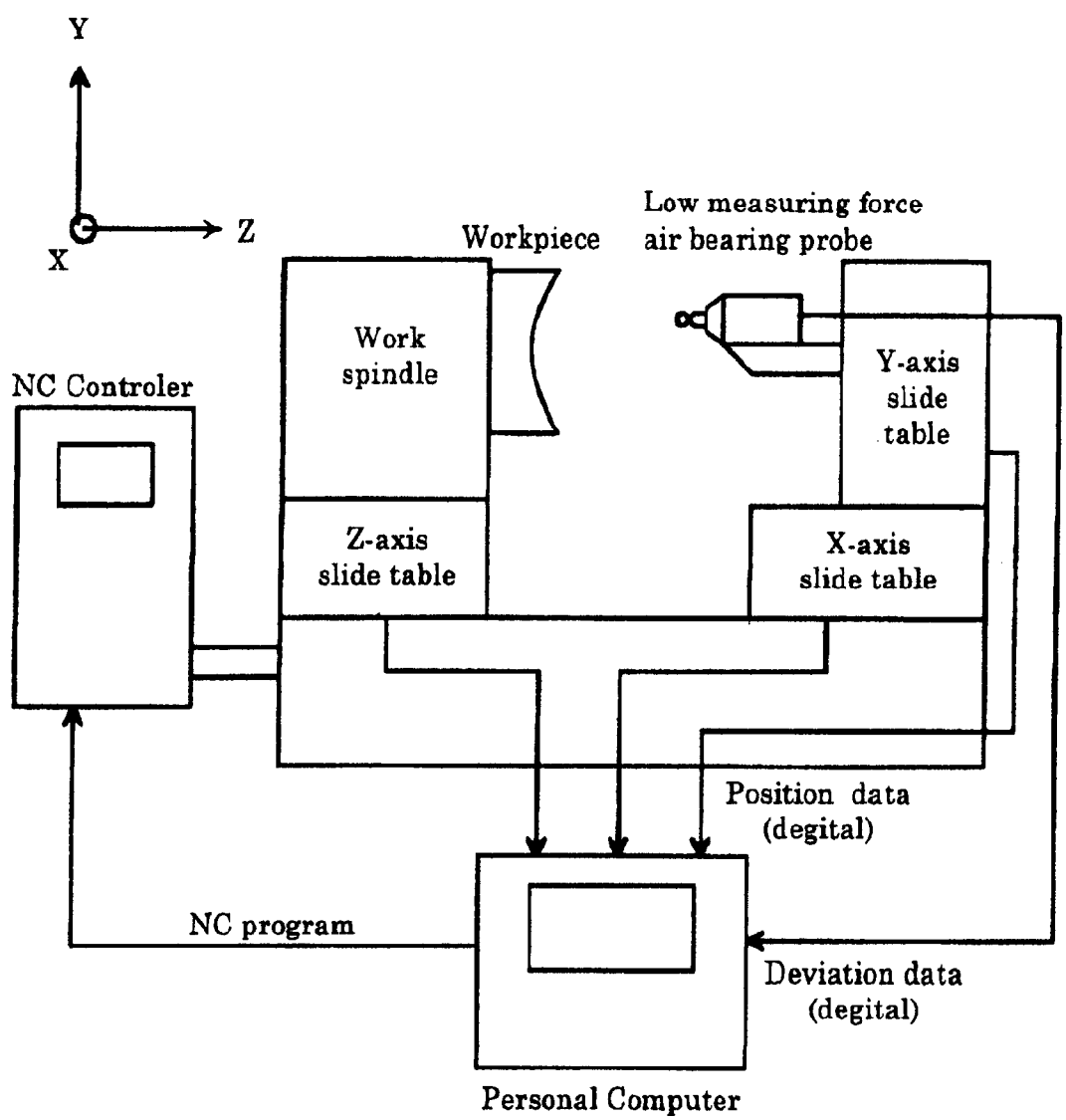
FIG. 8 is a diagram showing the configuration of the NC processing equipment according to the present invention.

When a shape measuring sensor is installed on a processing machine and carries out a measurement, an ordinary method known in the prior art is that NC data are transmitted from a personal computer to the NC controller, and after confirming that the machine has reached the demanded position, the displacement of the shape measuring sensor at the position is input to the personal computer. According to this method, however, a long time is spent to make a measurement because the machine must stop at each measuring point and perform a measurement. In this connection, according to the present invention as shown in FIG. 8, information about the current position is output directly from the processing machine, and at the same time, the displacement of the shape measuring sensor is input into the personal computer, thereby the processing machine need not be stopped at each measuring point, and the machine can measure the displacements in real time. In this way, a high-accuracy and high-speed measurement can be achieved.

4. Correction for Tilting of an Installed Sensor, and Correction for the Shape of the Ball at the Tip of the Probe When a shape measuring sensor is installed on a processing machine, there is a slight displacement between the axes of the processing machine and the sensor. The measuring error caused by this displacement increases as the angle of inclination of a workpiece becomes large, and for the purpose of making highly accurate measurements, a correction is required by processing the data. Consequently, when a sensor was installed a tilting error and a probe-tip ball shape error were estimated and a correction was made using a reference ball and assuming a linear relationship between the variations of the coordinates of the machine and the outputs of the sensor.

The ratio of the sensor output η to the coordinate displacement δ (value for linearity correction), k, is given by the following equation, where at a measuring point of a workpiece the surface is inclined at an angle $\theta_1$ in the XZ plane and $\theta_2$ in the YZ plane, and when the sensor is installed, it is inclined at an angle $\alpha_1$ in the XZ plane and $\alpha_2$ in the YZ plane, and when the processing machine is displaced by a distance δ along the Z axis, the output of the sensor is η.

$$k = \frac{\xi}{\delta} = \frac{\sqrt{(\sin\alpha_1)^2 + (\cos\alpha_1 \cdot \sin\alpha_2)^2 + (\cos\alpha_1 \cdot \cos\alpha_2)^2}}{-\tan\theta_1 \cdot \sin\alpha_1 - \tan\theta_2 \cdot \cos\alpha_1 \cdot \sin\alpha_2 + \cos\alpha_1 \cdot \cos\alpha_2} \quad \text{[Equation 4]}$$

In practice, a reference ball was used, and the outputs from the sensor, η, and the coordinate displacements of the machine, δ, were measured at a number of points, gradients k were obtained by linear fitting, and the values of k obtained at these points were substituted in the above equation, and the angles of tilt $\alpha_1$, $\alpha_2$, when the sensor was installed, were determined using a least squares fitting method. Measured values satisfactorily agree with the theoretical values in both the X and Y directions. The measured data were compensated for errors based on the $\alpha_1$ and $\alpha_2$ values thus obtained, although the compensated data included the shape errors of both the reference ball and the tip ball of the probe superimposed, the shape errors of the tip of the probe could be evaluated using the reference ball because the roundness of the ball was very precise and the radius of curvature thereof could be estimated with a high accuracy. Therefore, generally the measured data can be corrected based on a shape error map of the tip ball of the probe, obtained as described above.

5. Evaluation of the Performance of the Shape Measuring Sensor

To evaluate the performance of a shape measuring sensor manufactured according to the present invention, the shape of the reference ball was measured three times for each of the X and Y directions and in both the positive and negative directions, that is, a total of four directions, and deviations of the data from a mean value curve were evaluated using standard deviations. Measurements could be carried out relatively stably under the conditions that the measuring pressure was from 100 mgf to 150 mgf and the measuring speed was from 50 mm/min to 100 mm/min. The reproducibility of the measured data in all directions of ±3σ<0.1 μm could be achieved. Regarding the absolute accuracy of measured data, the laser interferometric displacement meter used was guaranteed to have an accuracy of ±0.1 μm over a 30 mm range, therefore, this value determines the accuracy limit.

6. Conclusions

According to the present invention, a high-accuracy, small, probe type shape measuring sensor for on-machine measurements was newly developed. Features of the sensor that was manufactured are summarized as follows.

The size (about 130×40×30 mm for the main unit) is appropriate for easy installation on a processing machine.

Highly accurate measurements can be made because the measuring pressures can be controlled minutely.

Because a laser interferometric displacement meter was used, the linearity of the data over a long stroke is higher than for conventional differential transformer systems, and the stability with respect to temperature changes is also high.

By outputting information on the current position directly from the processing machine, measurements can be carried out in real time, so enabling high-speed measurements to be made.

The reproducibility achieved for measured data was ±3σ<0.1 μm in 4 directions.

As described above, in the probe type shape measuring sensor according to the present invention, a driving force in the direction of the work piece is produced by a difference in cross sectional areas at a step in the probe shaft, so there is absolutely no electrical drift. In addition, since a second pressurizing gas is supplied to create the driving force in the direction of the workpiece independently from the first pressurizing gas that causes the probe shaft to float, measuring pressures can be adjusted to produce a constant very small load without lowering the stiffness of the bearings of the probe. Furthermore, as the driving force in the direction of the workpiece is proportional to the pressure at the location of the step in the probe shaft and as no spring etc. is used, variations in measuring pressure associated with changes in the position of the probe can be eliminated, the linearity of the detector output is improved, and the measuring pressures can be changed freely by controlling the pressure of the second pressurizing gas.

Consequently, the probe type shape measuring sensor according to the present invention and the NC processing apparatus and shape measuring method provide various advantages such as low electrical drift, excellent linearity of the detector output, small variations in the measuring pressures with variations in the position of the probe, adjustability of the measuring pressures to produce a very small load without lowering the stiffness of the bearings of the probe, ability to freely change the measuring pressures, achievement of a sub-micron accuracy of about 0.1 μm thereby obtained, easily made compact, and convenient for application to on-machine measurements.

Moreover, by using this probe type shape measuring sensor, the waiting time can be reduced, intermediate portions between defined points can be measured, thus the number of defined points needed can be decreased, and the measuring time can be shortened.

The NC processing apparatus according to the present invention should not be limited only to the probe type shape measuring sensor, but it also includes such configurations as that a second sensor is installed or can be installed. That is, although the present invention has been described referring to several preferred embodiments, the scope of rights included in the present invention should be understood not to be limited only to these embodiments. Instead, the scope of rights of the present invention should include all modifications, corrections and equivalent entities included in the scope of the attached claims.

What is claimed is:

1. A probe shape measuring sensor comprising:
   a probe head that supports, in a movable manner, a probe capable of contacting a workpiece with a low resistance to sliding in the direction of the workpiece, wherein the probe head drives the probe with a small load in the direction of the workpiece; and a displacement measuring device that measures the displacement of the probe in a manner without contact, wherein the probe head comprises:

a long thin probe shaft having one end attached to the probe, and having a step at an intermediate positions thereof;

air bearings provided at each side of the step to support the probe shaft;

a first gas feeding means connected to provide a first pressurizing gas to the air bearings; and a second gas feeding means connected to feed a second pressurizing gas, and, optionally, a third pressurizing gas, to the location of the step, wherein the air bearings have a high stiffness in the radial direction and are disposed on the probe shaft to make the probe shaft float using the first pressurizing gas, whereby a resistance to sliding of the air bearings and the probe shaft is reduced, wherein the second gas feeding means maintains constant pressure of the second pressurizing gas and the optional third gas supplied to the location of the step thereby producing a driving force produced by a difference in probe shaft cross sectional area at the step in the direction of the workpiece so that the driving force is kept at a small value within a predetermined range.

2. The probe shape measuring sensor specified in claim 1, wherein the driving force of the probe shaft is not less than about 10 mgf and not more than about 500 mgf.

3. A shape measuring method comprising the steps of:
providing the probe shape measuring sensor specified in claim 2 incorporated in an NC processing device;
moving the probe shape measuring sensor relative to a workpiece; and
measuring the shape of the workpiece without removing the processed workpiece using the probe shape measuring sensor.

4. The shape measuring method specified in claim 3, further comprising:
processing, in real time, output from each numerical control axis of the NC processing device that are coordinates along each axis and signal output from the probe shape measuring sensor using a computer so the shape of the workpiece is measured without stopping the NC processing device.

5. An NC processing device comprising:
the probe shape measuring sensor specified in claim 1; and
a numerical control system connected to move the sensor, wherein the sensor is moved relative to the workpiece by the numerical control system so that the shape of the workpiece can be measured without dismounting the processed workpiece.

6. The NC processing device specified in claim 5, further comprising: an interface that outputs the coordinates of each numerical control axis and signals from the probe shape measuring sensor, in real time, to equipment outside the device.

7. The probe shape measuring sensor specified in claim 1, wherein the displacement measuring device comprises:
a reflecting mirror installed at the other end of the probe shaft;
an optical fiber with an emitting end surface that faces the reflecting mirror with a distance L between the optical fiber and the reflecting mirror; and a laser interferometric displacement meter that emits laser light through the optical fiber towards the reflecting mirror and measures the position of the reflecting mirror by light reflected from the reflecting mirror to the emitting end surface.

8. An NC processing device comprising:
the probe shape measuring sensor specified in claim 7; and
a numerical control system connected to move the sensor, wherein the sensor is moved relative to the workpiece by the numerical control system so that the shape of the workpiece can be measured without dismounting the processed workpiece.

9. The NC processing device specified in claim 8, further comprising: an interface that outputs the coordinates of each numerical control axis and signals from the probe shape measuring sensor, in real time, to equipment outside the device.

10. A shape measuring method comprising the steps of:
providing the probe shape measuring sensor specified in claim 7 incorporated in an NC processing device;
moving the probe shape measuring sensor relative to a workpiece;
measuring the shape of the workpiece without removing the processed workpiece using the probe shape measuring sensor.

11. The shape measuring method specified in claim 10, further comprising:
processing, in real time, output from each numerical control axis of the NC processing device that are coordinates along each axis and signal output from the probe shape measuring sensor using a computer so the shape of the workpiece is measured without stopping the NC processing device.

12. An NC processing device comprising the probe shape measuring sensor specified in claim 1, further comprising a numerical control system programmed to move the sensor relative to the workpiece so that the shape of the workpiece is measured without dismounting the processed workpiece.

13. The NC processing device specified in claim 12, further comprising an interface connected to output the coordinates of each numerical control axis and signals from the probe shape measuring sensor, in real time, to equipment outside the device.

14. An NC processing device comprising:
the probe shape measuring sensor specified in claim 2; and
a numerical control system connected to move the sensor, wherein the sensor is moved relative to the workpiece by the numerical control system so that the shape of the workpiece can be measured without dismounting the processed workpiece.

15. The NC processing device specified in claim 14, further comprising: an interface that outputs the coordinates of each numerical control axis and signals from the probe shape measuring sensor, in real time, to equipment outside the device.

16. A shape measuring method comprising the steps of:
providing the probe shape measuring sensor specified in claim 1 incorporated in an NC processing device;
moving the probe shape measuring sensor relative to a workpiece; and
measuring the shape of the workpiece without removing the processed workpiece using the probe shape measuring sensor.

17. The shape measuring method specified in claim 16, further comprising the steps of:

processing, in real time, output from each numerical control axis of the NC processing device and signal output from the probe shape measuring sensor using a computer so the shape of the workpiece is measured without stopping the NC processing device.

18. A shape measuring method comprising the steps of:

providing a probe installed at one end of a long thin probe shaft having a step at a location on the probe shaft;

supporting the probe shaft using a first pressurizing gas so that the probe shaft moves longitudinally with a low resistance to sliding;

supporting the probe shaft in an axial direction;

supplying a second gas, and optionally a third gas, to the location of the step to produce a driving force driving the probe shaft in the direction of the workpiece, wherein the driving force is kept at a small load by the pressure of the second gas, and optionally the third gas; and measuring a displacement of the probe in the direction of the workpiece in a manner without contact using a laser interferometric displacement meter.

19. A shape measuring method comprising the steps of:

providing the probe shape measuring sensor specified in claim 1 incorporated in an NC processing device;

moving the probe shape measuring sensor relative to a workpiece; and measuring the shape of the workpiece without removing the processed workpiece using the probe shape measuring sensor.

20. The shape measuring method specified in claim 19, further comprising the steps of:

processing, in real time, output from each numerical control axis of the NC processing device and signal output from the probe shape measuring sensor using a computer so that the shape of the workpiece is measured without stopping the NC processing device.

* * * * *